United States Patent [19]
Yi

[11] Patent Number: 5,953,306
[45] Date of Patent: Sep. 14, 1999

[54] MICRO NEEDLE PROBE APPARATUS HAVING PROBES CANTILEVERED OVER RESPECTIVE ELECTRONIC CIRCUITS, MOVING MEDIUM MEMORY DEVICE INCLUDING SAME AND METHOD OF MAKING SAME

[75] Inventor: You-Wen Yi, Yokohama, Japan

[73] Assignee: Hewlett-Packard Company, Palo Alto, Calif.

[21] Appl. No.: 08/845,585

[22] Filed: Apr. 25, 1997

[30] Foreign Application Priority Data

Apr. 25, 1996 [JP] Japan .................................. 8-130870

[51] Int. Cl.⁶ ........................................................ G11B 9/00
[52] U.S. Cl. .......................... 369/126; 205/306; 365/164
[58] Field of Search ............................. 369/126; 205/306, 205/307; 365/164

[56] References Cited

U.S. PATENT DOCUMENTS

| | | | |
|---|---|---|---|
| 5,028,983 | 7/1991 | Bickford et al. .......................... 357/69 |
| 5,149,673 | 9/1992 | MacDonald et al. .................... 437/192 |
| 5,216,631 | 6/1993 | Sliwa, Jr. ................................ 365/174 |
| 5,248,912 | 9/1993 | Zdelblick et al. ....................... 310/332 |
| 5,373,494 | 12/1994 | Kawagishi et al. ..................... 369/126 |
| 5,398,229 | 3/1995 | Nakayama et al. ..................... 369/126 |
| 5,426,631 | 6/1995 | Miyazaki et al. ....................... 369/126 |
| 5,554,851 | 9/1996 | Hirai et al. .............................. 369/126 |
| 5,600,137 | 2/1997 | Saito et al. .............................. 250/306 |
| 5,751,685 | 5/1998 | Yi ............................................. 369/126 |
| 5,886,922 | 3/1999 | Saito et al. .............................. 365/164 |

FOREIGN PATENT DOCUMENTS

| | | | |
|---|---|---|---|
| 0 526 237 | 2/1993 | European Pat. Off. ........ G11C 13/02 |
| 0 585 601 | 3/1994 | European Pat. Off. ........ H01L 23/58 |
| 0 745 987 | 12/1996 | European Pat. Off. .......... G11B 9/00 |
| WO 89/07259 | 8/1989 | WIPO ............................. G01N 27/00 |
| WO 96/11472 | 4/1996 | WIPO .............................. G11B 9/00 |

OTHER PUBLICATIONS

Storment, Christopher W. et al., "Flexible, Dry–Released Process for Aluminum Electrostatic Actuators", Journal of Microelectromechanical Systems, vol. 3, No. 3, Sep. 1994, pp. 90–96.

*Primary Examiner*—John W. Cabeca
*Assistant Examiner*—Kim-Kwok Chu
*Attorney, Agent, or Firm*—Ian Hardcastle

[57] ABSTRACT

A micro needle probe apparatus that includes a probe and its associated electronic circuit. The electronic circuit is formed in a substrate and includes at least one metal interconnection layer. The probe is cantilevered over the electronic circuit and is composed of a metal probe arm, a support post that anchors one end of the probe arm to the substrate, and a micro needle mounted adjacent the moveable end of the probe arm. The probe apparatus may be used as the read/write mechanism of the moving-medium type memory device.

20 Claims, 7 Drawing Sheets

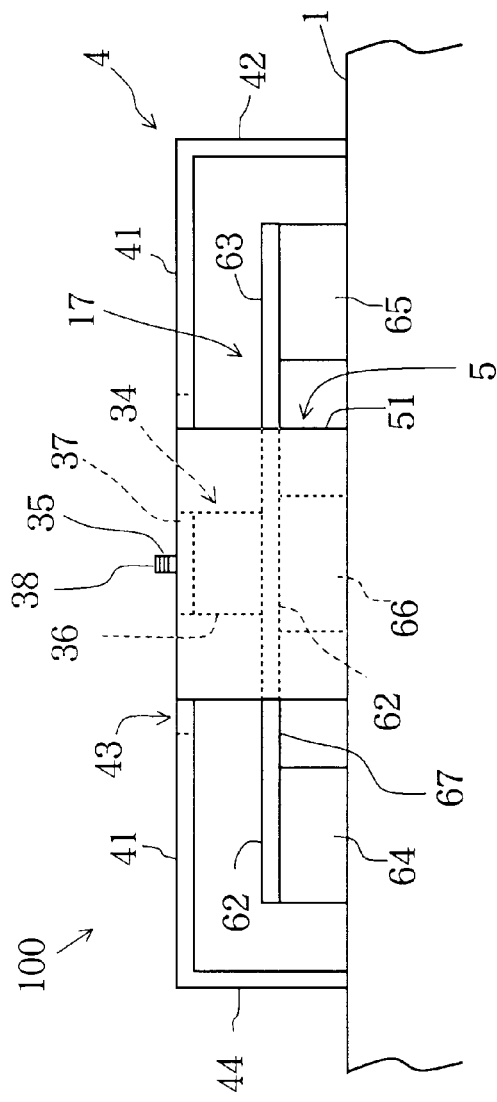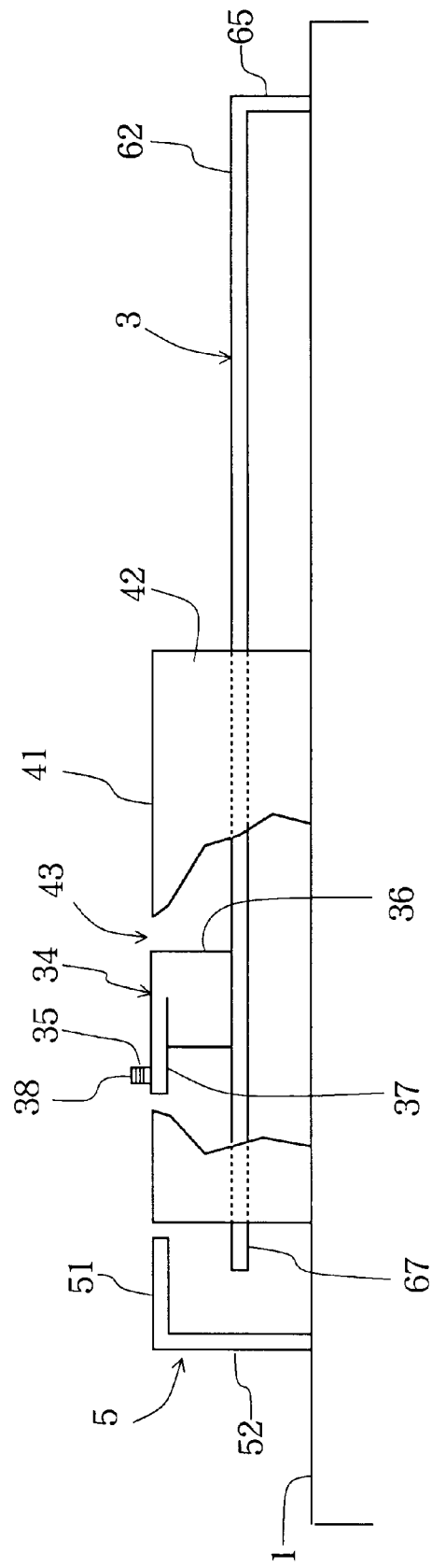

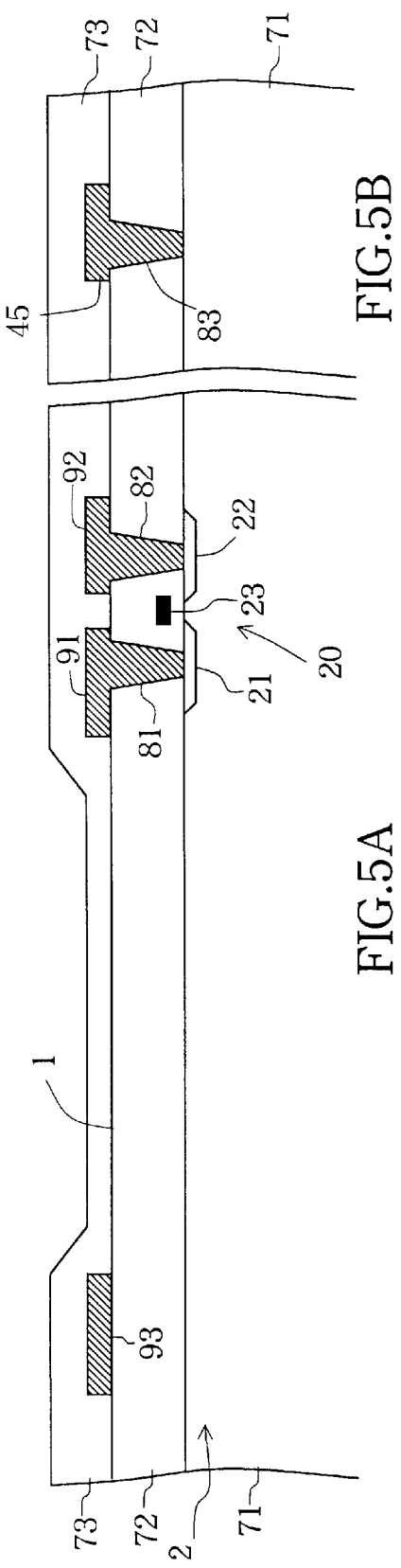
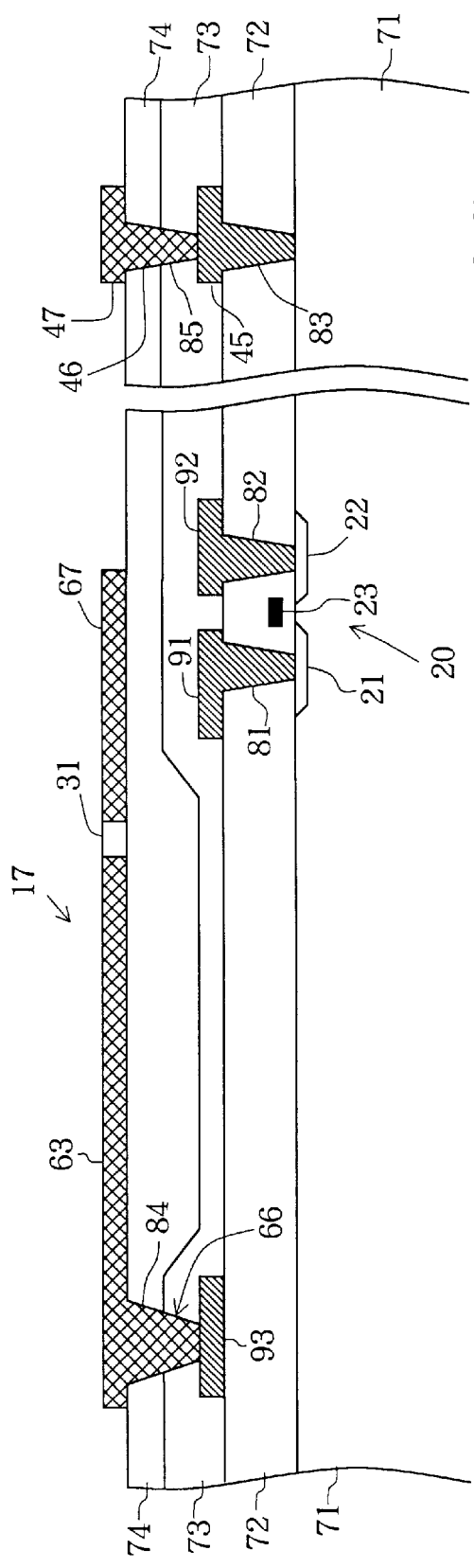
FIG.5A  FIG.5B
FIG.6A  FIG.6B

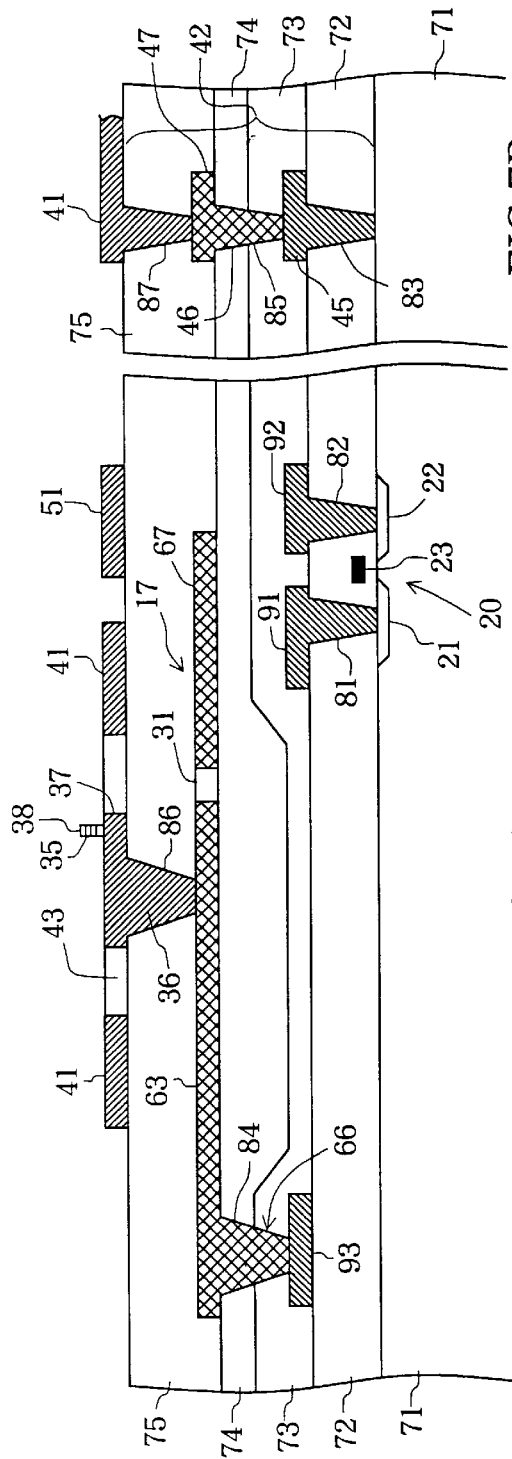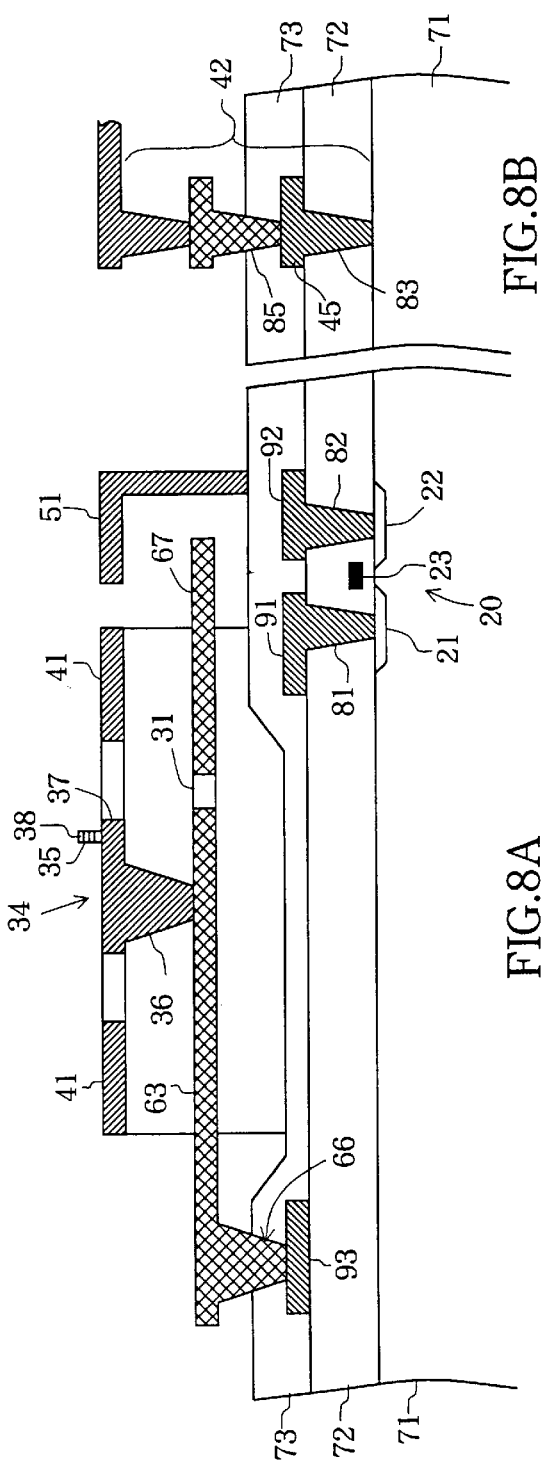

MICRO NEEDLE PROBE APPARATUS HAVING PROBES CANTILEVERED OVER RESPECTIVE ELECTRONIC CIRCUITS, MOVING MEDIUM MEMORY DEVICE INCLUDING SAME AND METHOD OF MAKING SAME

FIELD OF THE INVENTION

The invention relates to a micro needle probe apparatus that has probes cantilevered over respective electronic circuits. The invention also relates to a moving-medium type memory device incorporating such probe apparatus, and a method of manufacturing such probe apparatus.

BACKGROUND OF THE INVENTION

Various moving-medium type memory devices that use micro needles to read and write data have been proposed as replacements for hard disk drives and semiconductor memory devices such as CMOS devices. See, for example, U.S. Pat. No. 5,216,631 of Sliwa, Jr. and U.S. Pat. No. 5,373,494 of Kawagishi et al.

In a typical moving-medium type memory device, a large number of probes, for example, 100,000 probes, are arranged in a 2-dimensional array, and scan the surface of a recording medium. Each probe is composed of a cantilever probe arm and a micro needle. The probe arm is normally fixed at one end. The micro needle is mounted at or near the other end of the probe arm, remote from the fixed end, and extends perpendicularly to the probe arm towards the surface of the recording medium. Usually, the probe arms are driven by an electrostatic force to change the separation between the tips of the micro needles and the surface of the recording medium in the process of reading and writing the data.

Published International Application no. WO95/12932 of Saito and the inventor, and U.S. Pat. No. 5,600,137 of the inventor, disclose a moving-medium type memory device in which the probe arms are formed in part of a three-layer silicon structure composed of a silicon substrate, a buried silicon oxide layer, and silicon surface layer. The probe arms are formed by micromachining operations performed on the silicon surface layer.

The moving-medium type memory devices just described suffer from a number of problems.

First, the memory device conventionally includes an electronic circuit associated with each probe. The electronic circuit may include a data read/write circuit and a probe driving circuit, for example. The electronic circuit typically takes the form of an integrated circuit formed in and on the substrate near the probe. Such integrated circuits use a metal lead pattern to interconnect the various semiconductor components. The temperatures used in the processing to form the probe arms in the silicon surface layer are higher than those that can be tolerated by the metal lead pattern. Accordingly, when the memory devices are fabricated, the processing to form the metal lead patterns must be performed after the processing to form the probe arms in the silicon surface layer. This processing order means that the probe arms cannot extend over their respective electronic circuits. The electronic circuits must instead be located alongside the probes. This increases the area of the substrate occupied by the probes and their associated electronic circuits.

An important performance goal in moving-medium type memory devices is to increase the amount of data that can be read or written in one scan by increasing the density of the probes. Increasing the density of the probes also enables a moving-medium memory device of a given storage capacity to be made smaller, with a consequent lower manufacturing cost. However, locating the electronic circuits alongside the probes on the semiconductor substrate surface limits the probe density that can be achieved.

Second, the electronic circuits project from the semiconductor substrate surface towards the surface of the recording medium. The electronic circuits project by a much greater distance than the maximum deflection distance of the moving end of the probe arm on which the micro needle is mounted. Consequently, when the electronic circuits are fabricated in the same substrate as the probe arms, the maximum deflection distance of the moving end of the probe arm must be increased, or the micro needle must be lengthened to accommodate the height of the electronic circuits above the substrate surface. To increase the maximum deflection distance of the moving end of the probe arm, the drive voltage for the probe arm must be increased. This increases the power consumption of the moving-medium type memory device. Alternatively, the micro needle can be lengthened to accommodate the height of the electronic circuit, but this cannot be done using currently-available process technologies. Even if the micro needle could be lengthened, a longer micro needle would be more susceptible to damage.

The problem just described can be partially solved by providing the probe arm with an auxiliary electrode. The auxiliary electrode has an electrode surface disposed parallel to the semiconductor substrate surface and located closer to the surface of the recording medium than the probe arm. The auxiliary electrode enables the probe arm to be driven by a lower voltage, and does not require significant lengthening of the micro needle.

However, even when the probes are fitted with an auxiliary electrode, the height to which the electronic circuits can project above the surface of the substrate is limited. The height limitation is such that the interconnections of the electronic circuits cannot be formed using multiple layers. It is desirable to be able to form the electrical interconnections using multiple layers, since this would enable the area of the substrate occupied by the electronic circuits to be reduced. This would result in a higher probe density and a smaller moving-medium type memory device.

Finally, forming the probes by micromachining techniques in the upper layer of a three-layer semiconductor structure can produce probes that are subject to warping. Warping occurs as a result of the high temperatures involved in the probe fabrication process leaving high residual stress in the material of the probe. The probe warping changes the gap between the surface of the recording medium and the tip of the micro needle mounted on the probe arm. This gap having an incorrect value causes data read/write errors. To prevent probe warping from causing such errors, the electronic circuit must include an additional circuit to control the gap or to control the contact pressure between the surface of the recording medium and the tip of the micro needle. This additional circuit makes it harder to increase the probe density of the moving-medium type memory device.

A probe apparatus is desired that achieves the above-mentioned goals of increasing the probe density and reducing size without increasing the maximum deflection of the moving end of the probe arm and without increasing the length of the micro needle, that allows multi-layer interconnections to be used in the electronic circuits, and that prevents read/write errors by using probes that do not warp.

SUMMARY OF THE INVENTION

The invention provides a micro needle probe apparatus that includes a probe and its associated electronic circuit. The electronic circuit is formed in a substrate and includes at least one metal interconnection layer. The probe is cantilevered over the electronic circuit and is composed of a metal probe arm, a support post that anchors one end of the probe arm to the substrate, and a micro needle mounted adjacent the moveable end of the probe arm. The probe apparatus may be used as the read/write mechanism of the moving-medium type memory device. The probe apparatus according to the invention can also be used as the manipulator in a scanning probe microscope.

The electronic circuit is formed in and on the substrate and employs metal interconnections. The metal interconnections may be multi-layer interconnections to reduce the size of the electronic circuit. The probe is cantilevered over the surface of the substrate, including the parts surface occupied by the electronic circuit. Accordingly, the area of the substrate occupied the probe and its associated electronic circuit is considerably less than that occupied by a conventional arrangement in which the probe and its associated electronic circuit are located alongside one another.

In the probe apparatus according to the invention, the probe is cantilevered over the electronic circuit. The probe is therefore located closer to the probe target than the interconnections of the electronic circuit. This arrangement imposes fewer restrictions on the height of the electronic circuit, which allows the interconnections of the electronic circuit to be formed using one layer or many layers.

In the probe apparatus manufacturing method according to the invention, a substrate is provided and an electronic circuit having at least one layer of interconnections is formed in the substrate. After forming the at least one layer of interconnections, a probe cantilevered over the electronic circuit is formed by building a probe support post on the substrate, fabricating a probe arm attached to the probe support post from a single layer of metal, and forming a micro needle located on the probe arm at a point remote from the probe support post.

Forming the probe from metal instead of silicon enables the probe to be formed after the interconnections of the electronic circuit have been formed. The probe can then be cantilevered over the electronic circuit, so the probe and the electronic circuit can effectively share the same area of the substrate. This enables the density of the probes to be increased, and enables the moving-medium type memory device to be made smaller. In addition, cantilevering the probe over the electronic circuit enables the maximum deflection of the moveable end of the probe arm, and the length of the micro needle, to be reduced. This reduces both the power consumption of the probe apparatus, and the likelihood of damage to the micro needle. Moreover, since the electronic circuit can employ multi-layer interconnections, further reductions in the size of the moving-medium type memory device are possible.

Forming the probe arm from a single layer of a metal like aluminum results in a probe arm that is not subject to warping due to residual stress. Therefore, data read and write errors caused by using warped probes are prevented. Since the geometry of the probe arm is known, there is no need to employ an additional circuit to control the distance and contact pressure between the surface of the recording medium and the tip of the conductive needle. This makes it easier to develop smaller moving-medium type memory devices.

BRIEF DESCRIPTION OF THE DRAWINGS

FIG. 2 is a front view of the probe apparatus according to the invention shown in FIG. 1.

FIG. 3 is a side view of the probe apparatus according to the invention shown in FIG. 1.

FIGS. 5A and 5B show forming the electronic circuit and a first stage of forming the probe in the probe apparatus manufacturing method according to the invention. FIG. 5A is a cross-sectional view in the direction A—A shown in FIG. 1. FIG. 5B is a cross-sectional view in the direction B—B shown in FIG. 1.

FIGS. 6A and 6B show a second stage of forming the probe in the probe apparatus manufacturing method according to the invention. FIG. 6A is a cross-sectional view in the direction A—A shown in FIG. 1. FIG. 6B is a cross-sectional view in the direction B—B shown in FIG. 1.

FIGS. 7A and 7B show a third stage of forming the probe in the probe apparatus manufacturing method according to the invention. FIG. 7A is a cross-sectional view in the direction A—A shown in FIG. 1. FIG. 7B is a cross-sectional view in the direction B—B shown in FIG. 1.

FIGS. 8A and 8B show a final stage of forming the probe in the probe apparatus manufacturing method according to the invention. FIG. 8A is a cross-sectional view in the direction A—A shown in FIG. 1. FIG. 8B is a cross-sectional view in the direction B—B shown in FIG. 1.

DETAILED DESCRIPTION OF THE INVENTION

Figure 1:
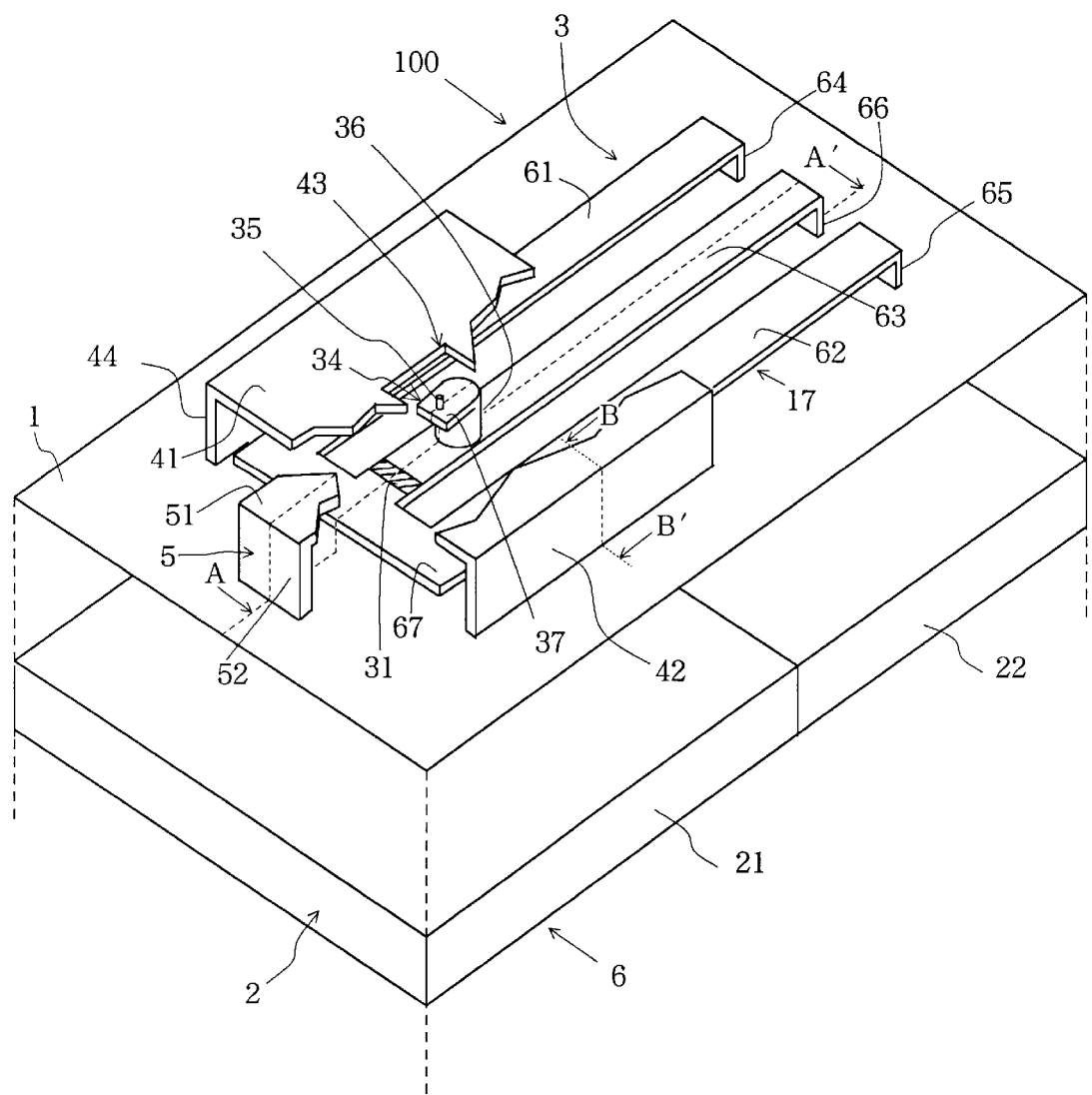
FIG. 1 is an exploded perspective view of an embodiment of the probe apparatus according to the invention for use as the data read/write mechanism of a moving-medium type memory device.

The micro needle probe apparatus according to the invention includes a probe and its associated electronic circuit. The electronic circuit is formed in a substrate and includes at least one metal interconnection layer. The probe is cantilevered over the electronic circuit and is composed of a metal probe arm, a support post that anchors one end of the probe arm to the substrate, and a micro needle mounted adjacent the moveable end of the probe arm. The probe apparatus may be used as the read/write mechanism of the moving-medium type memory device according to the invention and can also be used as the manipulator in a scanning probe microscope.

The electronic circuit is formed in and on the substrate and employs metal interconnections. The metal interconnections may be multi-layer interconnections to reduce the size of the electronic circuit. The surface of the substrate in which the electronic circuit is formed constitutes a probe support surface. The probe is cantilevered over the probe support surface, including the parts of the probe support surface occupied by the electronic circuit. Accordingly, the area of the substrate occupied the probe and its associated electronic circuit is considerably less than that occupied by a conventional arrangement in which the probe and its associated electronic circuit are located alongside one another.

The probe apparatus preferably also includes a fixed electrode, and the probe arm includes a probe electrode. Both electrodes will be further described below. The electronic circuit includes a circuit that applies a drive voltage between the probe electrode and the fixed electrode to apply an electrostatic force to the probe arm. When the probe apparatus is used as the read/write mechanism in the moving-medium type memory device, the electronic circuit also includes a data read/write circuit.

Forming the probe arm from metal by, for example, selectively etching a single layer of a metal such as aluminum, enables the probe arm to be easily produced with a variety of shapes. For example, the probe arm can be a single elongate beam with one end anchored to the probe support surface and the micro needle mounted adjacent the moveable end of the beam, remote from the anchored end. Alternatively, the probe arm can be L-shaped in plan view with the micro needle attached adjacent the apex. The end of one arm or the ends of both arms of the L-shaped probe arm can be anchored to the probe support surface. As a further alternative, the probe arm can be shaped like a three-tined fork in plan view. The ends of the tines remote from the micro needle are anchored to the probe support surface. The micro needle is mounted on one of the tines, remote from the anchored end. The probe arm itself is preferably disposed substantially parallel to the probe support surface.

As noted above, the probe apparatus according to the invention includes a fixed electrode and the probe arm includes a probe electrode. The probe electrode is preferably part of the probe arm. The fixed electrode is disposed substantially parallel to the probe arm and the probe support surface, and preferably bridges the probe, so that it is located between the probe arm and the probe target. The probe surface may alternatively serve as the fixed electrode.

The probe target is the surface that will be probed by the tip of the micro needle mounted on the probe arm. Normally, this surface is disposed substantially parallel to the probe support surface. A voltage applied between the probe electrode and the fixed electrode establishes an electrostatic field that moves the micro needle mounted on the probe arm in a direction perpendicular to the probe support surface. This moves the micro needle towards, into contact with, or away from the probe target.

The probe arm preferably includes a section that supports the micro needle. This section will be called the needle support section. The probe arm also includes at least one section that provides the probe electrode. This section will be called the electrode section. For example, in a probe arm that is shaped like a three-tined fork in plan view, the two outer tines are electrode sections, and the center tine is the needle support section. In this case, the needle support section is mechanically connected to, and electrically insulated from, the electrode sections. Common physical elements may provide all or part of both the needle support section and the electrode section, as occurs when the probe arm is a single, elongate beam, for example.

The probe electrode can be installed in a specific position on the probe arm, and can extend laterally relative to the probe arm to provide it with a greater width than that of the probe electrode.

When the probe apparatus according to the invention is used as the data read/write mechanism of a moving-medium type memory device, the needle support section is electrically connected to the data read/write circuit, and the electrode section is electrically connected to the probe drive circuit.

When the probe apparatus according to the invention is used as the data read/write mechanism in a moving-medium type memory device, and the probe arm is a single piece of metal, instead of being composed of a needle support section that is electrically insulated from an electrode section, the electronic circuit usually includes an additional circuit. The additional circuit is required to discriminate between the read/write signal and the drive signal used to deflect the moveable end of the probe arm in the direction perpendicular to the probe support surface, i.e., towards or away from the probe target.

When the probe apparatus according to the invention is used as the manipulator in a scanning probe microscope, the probe target is a semiconductor or metal sample.

When the probe apparatus according to the invention is used as the data read/write mechanism of a moving-medium type memory device, the probe target is a recording medium made of a ferroelectric or a dielectric. A large number of probes are disposed on the probe mounting surface in a two-dimensional array, and one or both of the recording medium and the probe mounting surface are moved parallel to one another to read or write data in the recording medium. Moreover, the probes are moved into and out of contact with the surface of the recording medium to read and write data.

In the probe apparatus according to the invention, the probe is cantilevered over the electronic circuit. The probe is therefore located closer to the probe target than the interconnections of the electronic circuit. This arrangement imposes fewer restrictions on the height of the electronic circuit, which allows the interconnections of the electronic circuit to be formed using one layer or many layers.

When the probe apparatus according to the invention is used as the data read/write mechanism of a moving-medium type memory device, the fixed electrode is also located closer to the probe target than the interconnections of the electronic circuit.

An embodiment of the probe apparatus according to the invention and an embodiment of the moving-medium type memory device according to the invention will now be described in detail with reference to FIGS. 1 to 4.

Figure 4:
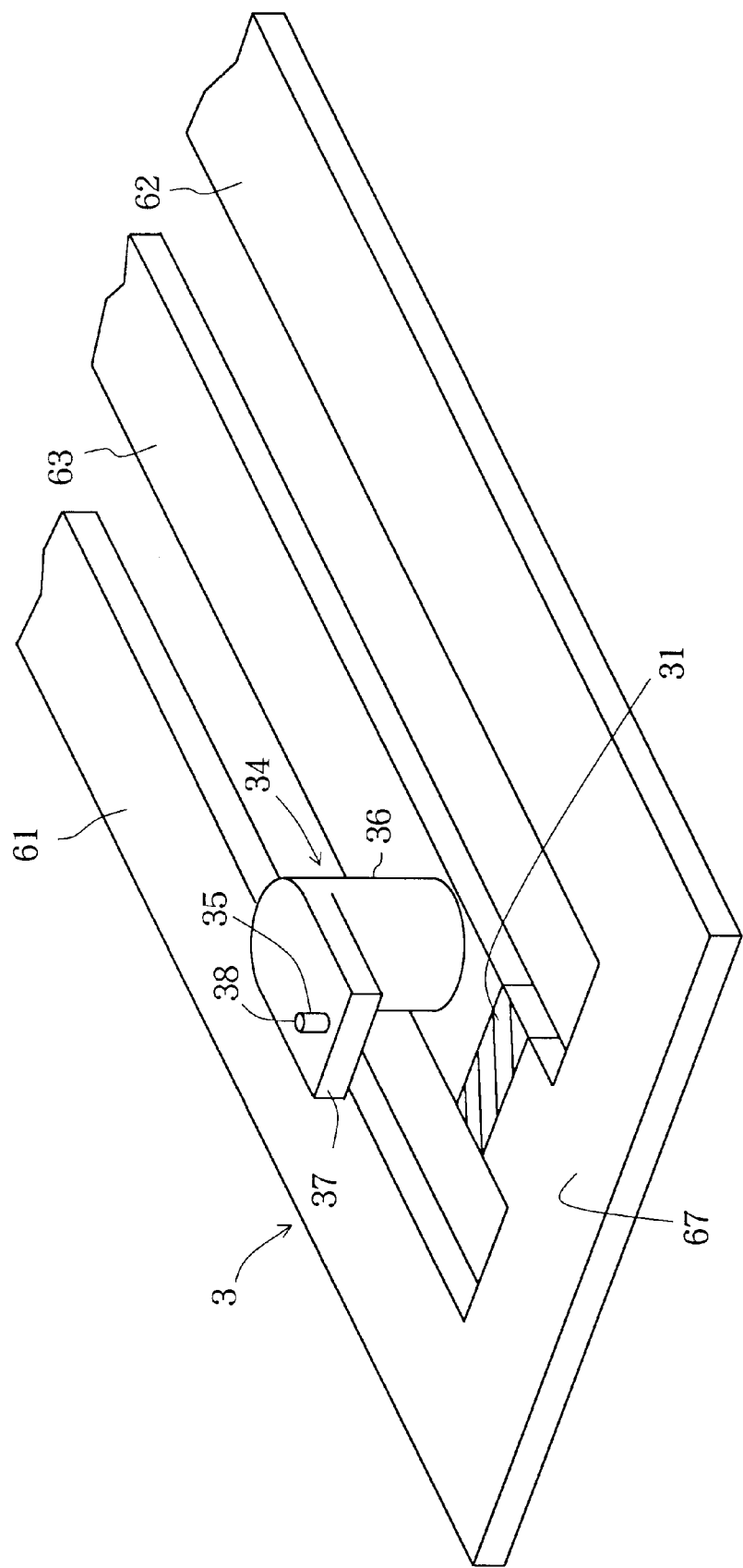
FIG. 4 is an enlarged perspective view of the moveable end of the probe arm of the probe apparatus shown in FIGS. 1 through 3.

FIG. 1 is an exploded perspective view of an embodiment of the probe apparatus for use as the data read/write mechanism of a moving-medium type memory device. In FIG. 1, the probe support surface 1, and the probe 3, the fixed electrode 4 and the probe travel limiter 5 mounted on the probe support surface are shown detached from the electronic circuit 2 formed in and on the substrate 6 so that exemplary circuits 21 and 22 constituting the electronic circuit 2 can be seen more easily. FIGS. 2 and 3 are front and side views, respectively, of the probe apparatus shown in FIG. 1. FIG. 4 is an enlarged perspective view of the moveable end of the probe arm forming part of the probe of the probe apparatus. FIGS. 1 to 4 are partially schematic, so do not accurately portray the actual thickness and size of each structural element.

In the probe apparatus 100 shown in FIGS. 1 through 3, the electronic circuit 2 is composed of semiconductor devices, such as CMOS transistors, formed in and on the substrate 2. As noted above, the probe support surface 1 is a surface of a layer of an insulator, such as silicon dioxide or silicon nitride, that covers the surface of the electronic circuit 2. In the example shown, the electronic circuit 2 includes the probe drive circuit 21 and the data read/write circuit 22. Fewer or more electronic circuits than those shown may constitute the electronic circuit 2.

The probe 3 is composed of the probe arm 17, the micro needle assembly 34, and one or more probe support posts. In the example shown, the probe arm 17 is shaped like a three-tined fork, and is composed of the electrode sections 61 and 62, the needle support section 63 located between, and parallel to, the electrode sections, and the connecting section 67. The probe arm support posts 64, 65 and 66 respectively anchor one end of each of the electrode sections and the needle support section to the probe support surface 1, and cantilever the probe arm parallel to, and spaced from, the probe support surface. The connecting section 67 mechanically interconnects the ends of the electrode sections and the needle support section remote from the probe support posts 64, 65 and 66. The end of the probe arm remote from the probe support posts is the moveable end of the probe arm.

The micro needle assembly 34, composed of the needle post 36, the needle mounting plate 37 and the micro needle 35, is mounted on part of the needle support section 63 of the probe arm 17 remote from the end of the needle support section anchored by the probe support post 66.

The fixed electrode assembly 4 is composed of the fixed electrode 41 and the fixed electrode support posts 42 and 44. The fixed electrode support posts anchor the fixed electrode to the probe support surface 1 and support the fixed electrode parallel to, and spaced from, the probe support surface. The spacing between the fixed electrode and the probe support surface is greater than that between the probe arm and the probe support surface so that the fixed electrode bridges the part of the probe arm on which the micro needle assembly 34 is mounted. The fixed electrode defines the aperture 43 through which the micro needle assembly projects to enable the micro needle 35 to contact the probe target.

The probe travel limiter assembly 5 is composed of the probe travel limiter 51 and the limiter support post 52. The limiter support post anchors the probe travel limiter to the probe support surface 1 and supports the probe travel limiter parallel to, and spaced from, the probe support surface.

Through holes formed in the insulating layer covering the electronic circuit 2 provide an electrical connection between the probe drive circuit 21 and the electrode sections 64 and 65, and to the fixed electrode 41. The electrical connection to the electrode sections is made via the probe arm support posts 64 and 65, and the electrical connection to the fixed electrode is made via either or both of the fixed electrode support posts 42 and 44. The data read/write circuit 22 is electrically connected to the needle support section 63 via the probe arm support post 66. The support posts make electrical contact with the interconnection layer or layers of the electronic circuit.

The structure of the probe 3 will now be described in more detail. As noted above, the probe is composed of the probe arm 17, the micro needle assembly 34, and at least one probe support post. In the example shown, the probe arm is anchored to the probe support surface 1 by the probe support posts 64, 65 and 66. The probe arm fabricated in single layer of metal, such as aluminum. In the example shown, the probe arm is shaped in plan view like a three-tined fork. The two outer tines of the three-tined fork are the two electrode sections 61 and 62, and the center tine is the needle support section 63. The connecting section 67 mechanically interconnects the ends of the tines remote from the probe support posts.

One end of each of the three sections 61, 62 and 63 of the probe arm 17 is anchored to the probe support surface 1 by the probe support posts 64, 65 and 66, respectively. The probe support posts are also fabricated from a metal, such as aluminum. The electrode sections 61 and 62 extend from the probe support posts 64 and 65, parallel to the probe support surface 1. The needle support section 63 extends from the probe support post 66, parallel to the probe support surface 1. The ends of the electrode sections remote from the probe support posts are mechanically and electrically connected by the connecting section 67. In addition, the insulating section 31 mechanically connects the end of the needle support section 63 remote from the probe support post 66 to the connecting section 67. However, the insulating section electrically isolates the needle support section from the electrode sections.

As described above, the electrode sections 61 and 62 are electrically connected to the probe drive circuit 21 by the probe support posts 64 and 65, respectively. The needle support section 63 is electrically connected to the data read/write circuit 22 by the probe support post 66.

The micro needle assembly 34 is shown in more detail in FIG. 4. The needle post 36 extends perpendicular to the probe arm 17 from a point near the end of the needle support section 63. The needle post extends towards the surface of the recording medium (not shown). The needle post 36 terminates in the needle mounting plate 37. The needle mounting plate extends parallel to the needle support section from the end of the needle post towards the connecting section 67. The micro needle 35 is mounted adjacent the end of the needle mounting plate 37 remote from the needle post, and extends perpendicular to the plane of the needle mounting plate. The thickness of the needle mounting plate 37 is preferably less than that of the probe arm 17 so that the spring constant per unit length of the needle mounting plate is less than that of the probe arm. The resulting greater compliance of the needle mounting plate 37 in the direction perpendicular to the probe support surface 1 decreases friction between the micro needle and the recording medium. This structure for decreasing friction between a micro needle and a recording medium is disclosed in detail in the inventor's published European patent application no. EP 0 745 987.

The fixed electrode assembly 4 and the probe travel limiter assembly 5 will be described in more detail next.

The fixed electrode assembly 4 and probe travel limiter assembly 5 are both made from metal such as aluminum. The fixed electrode assembly 4 is composed of the fixed electrode 41 formed parallel to the probe support surface 1 and the fixed electrode support posts 42 and 44. The fixed electrode support posts anchor the fixed electrode to the probe support surface at two locations on opposite sides of the probe 3. The fixed electrode 41 bridges the probe, and is located so that it does not completely cover the connecting section 67 of the probe arm 17, as shown in FIG. 3. This enables the connecting section of the probe arm to contact the probe travel limiter 51, which will be described below, so that the probe travel limiter can limit the maximum excursion of the probe arm 17 relative to the probe support surface.

The fixed electrode 41 defines the aperture 43. The aperture is located at a position corresponding to that of the micro needle assembly 34 so that the micro needle assembly can access the probe target through the aperture. The fixed electrode 41 is electrically connected to the probe drive circuit 21 by the fixed electrode support posts 42 and 44, as will be described in more detail below with reference to FIG. 5B.

The probe travel limiter assembly 5 is composed of the probe travel limiter 51 and the limiter support post 52. The limiter support post anchors the probe travel limiter to the probe support surface 1. The probe travel limiter is disposed parallel to, and spaced from, the probe support surface, and extends from the limiter support post towards the connecting section 67 of the probe arm 17. The spacing between the probe travel limiter 51 and the probe support surface 1 is preferably equal to that between the fixed electrode 41 and the probe support surface. The probe travel limiter assembly 5 prevents the micro needle 35 from contacting the probe target with too large a force, and prevents the probe arm 17 contacting the fixed electrode 41.

The electrical potential of the probe travel limiter assembly 5 is preferably the same as that of the electrode sections 61 and 62 of the probe arm 17. In this embodiment, the limiter support post 52 electrically connects the probe travel limiter 51 to the probe drive circuit 21.

Next, the operation of the probe apparatus shown in FIGS. 1 to 4 will be described. The probe drive circuit 21 shown in FIG. 1 applies a probe drive voltage between the electrode sections 61 and 62 of the probe arm 17 and the fixed electrode 41 of the fixed electrode assembly 4. This generates an electrostatic force between the electrode sections 61 and 62 and the fixed electrode 41. The electrostatic force moves the movable end of the probe arm 17 towards the electrode 41. This moves the micro needle 35 towards, and possibly into contact with, the surface of the recording medium (not shown).

The probe drive circuit 21 can include an additional circuit that detects and controls the distance between the tip 38 of the micro needle 35 and the surface of the recording medium and that additionally or alternatively detects and controls the force acting between the tip of the micro needle and the surface of the recording medium in embodiments in which such detection and control is needed. However, in most applications, such additional circuit is not required because of the low incidence of warping in the metal probe arms.

When the moveable end of the probe arm 17 moves too close to the fixed electrode 41 because of a control error, the connecting section 67 of the probe arm touches the probe travel limiter 51 of the probe travel limiter assembly 5. This prevents the tip 38 of the micro needle 35 from applying an excessive pressure to the surface of the recording medium. Since the support posts 64, 65 and 66 act as the pivot for the probe arm 17, and the probe travel limiter 51 is at the same spacing from the probe support surface as the fixed electrode, the probe travel limiter prevents the probe arm from contacting the fixed electrode.

During data read and write operation in moving-medium type memory devices, the recording medium and probe apparatus may move relative to each other either with the tip of the micro needle in contact with the surface of the recording medium, or with the tip of the micro needle spaced from the surface of the recording medium by a microscopic distance. The moving-medium type memory device according to the invention may operate in either of these modes. Operation of the moving-medium type memory device according to the invention in either of these modes is conventional, and operations to read data from and write data to the recording medium are conventional. Accordingly, detailed descriptions of such operations are omitted.

The method according to the invention of making the probe apparatus according to the invention will be described next. In the probe apparatus manufacturing method according to the invention, an electronic circuit having at least one layer of interconnections is formed, and is covered by an insulating layer that provides a probe support surface. The cantilever probe is formed from a probe arm, a probe electrode for moving the moveable end of the cantilever arm towards, into contact with, or away from the probe target, and a micro needle located at or near the moveable end of the probe arm.

The probe apparatus is fabricated by forming the probe from metal. Forming the probe from metal enables the probe arm to be fabricated after the electronic circuit has been formed. This, in turn, enables the probe and the electronic circuit to share the same area of the substrate by cantilevering the probe over the electronic circuit at a location closer to the probe target than the interconnections of the electronic circuit.

The probe apparatus manufacturing method according to the invention also includes forming a fixed electrode over, and separated from, the probe support surface. The fixed electrode is also located closer to the probe target than the interconnections of the electronic circuit.

The method according to the invention for manufacturing the probe apparatus according to the invention will now be described in detail with reference to FIGS. 5A through 8B. FIGS. 5A, 6A, 7A and 8A are lengthwise cross sectional views of the needle support section 63 of the probe 3 along the line A–A' shown in FIG. 1, and illustrate the processing steps used to fabricate the probe support post 66, the needle support section 63 and connecting section 67 of the probe arm 17, and the micro needle assembly 34. FIGS. 5B, 6B, 7B and 8B are cross sectional views of part of the fixed electrode assembly 4 along the line B–B' shown in FIG. 1 and illustrate how the processing steps illustrated in FIGS. 5A, 6A, 7A and 8A additionally fabricate the fixed electrode 41 and the fixed electrode support post 42.

FIG. 5A shows the probe apparatus after the electronic circuit 2 has been fabricated. In FIGS. 5A, 6A, 7A and 8A, the transistor 20 is shown as an example of the electronic components constituting the electronic circuit 2. The remaining electronic components constituting the electronic circuit have been omitted to simplify the drawings. Moreover, the transistor 20 is shown as a MOS field-effect transistor in this example, but the transistor can be any type of transistor. The electronic components may include one or more layers of metal interconnecting other components constituting the electronic circuit. The transistor 20 includes the source 21, drain 22, and gate 23 formed in and on the silicon semiconductor substrate 71.

After the silicon components constituting the electronic circuits 2 have been formed, the insulating layer 72 is deposited over the entire surface of the substrate 71. The insulating layer 72 is preferably a layer of silicon dioxide. Through holes are formed in the insulating layer where a first layer of metal constituting an interconnect layer is to make electrical contact to the silicon components, such as the transistor 20, formed in the substrate 71. For example, the through holes formed in the insulating layer include the through holes 81 and 82 through which electrical contact will be made to the source 21 and drain 22, respectively, of the transistor 20 formed in the substrate 71.

A first layer of metal is next deposited on the surface of the insulating layer 72. This metal is preferably aluminum, but other suitable metals such as gold or titanium may alternatively be used. Depositing the first layer of metal on the insulating layer 72 fills the through holes 81 and 82 with the metal. Thus, the metal makes electrical contact with the source 21 and drain 22, respectively, of the transistor 20. The first layer of metal is then selectively removed, preferably by etching, to define the metal interconnections 91 and 92, and the anchor pad 93. The anchor pad 93 constitutes part of the probe support post 66 (FIG. 1). Selectively removing parts of the first layer of metal defines a track, not shown in the drawing, that electrically connects the anchor pad 93 to the data read/write circuit 22. Anchor pads (not shown) that constitute part of the probe support posts 64 and 65 (FIG. 1) are formed simultaneously with the anchor pad 93. Selectively removing parts of the first layer of metal defines an additional track (not shown) that electrically connects the anchor pads that constitute part of the probe support posts 64 and 65 to the probe drive circuit 21.

FIG. 5B shows how the processing illustrated in FIG. 5A also forms part of the fixed electrode assembly 4. Removing parts of the insulating layer 72 to form not only the through holes 81 and 82 but also the through hole 83 in which part of the fixed electrode support post 42 will be formed. Depositing the first layer of metal on the surface of the insulating layer not only fills the through holes 81 and 82 with metal, but also fills the through hole 83 with the metal. Selectively removing parts of the first layer of metal not only defines the metal interconnections 91 and 92 and the anchor pad 93 but also defines the anchor pad 45.

Although not shown, an anchor pad that forms part of the limiter support post 52 of the probe travel limiter assembly 5 is formed at the same time and in the same way as the anchor pad 45 of the fixed electrode assembly 4. Selectively removing parts of the first layer of metal additionally defines a track (not shown) that electrically connects the anchor pad 52 to the anchor pads (not shown) that constitute parts of the probe support posts 64 and 65. When the probe apparatus is complete, this electrical connection sets the probe travel limiter assembly to the same electrical potential as the electrode sections 61 and 62 of the probe 3.

FIG. 6A shows how the rest of the probe support post 66 is formed and the needle support section 63 and connecting section of the probe arm 17 are fabricated. The insulating layer 73 is deposited to cover the surface of the insulating layer 72 and the first layer of metal constituting the interconnect layer. A polyimide layer 74 is deposited on the insulating layer 73, preferably by spin casting to provide it with a flat surface. Parts of the polyimide layer and the insulating layer are then removed to define the through hole 84. The through hole 84 provides access to the anchor pad 93.

A second layer of metal is then deposited on the surface of the polyimide layer 74. The metal is preferably aluminum, but other suitable metals can be used. Depositing the second layer of metal fills the through hole 84 with metal. The metal bonds to the anchor pad 93 to form the probe support post 66. Formation of the probe support posts 64 and 65 (FIG. 1) is simultaneously completed by the metal filling through holes (not shown) located on opposite sides of the through hole 84.

Parts of the second layer of metal are then selectively removed, preferably by etching, to define the probe arm 17. The needle support section 63 and the connecting section 67 of the probe arm are shown in FIG. 6A. Since FIG. 6A is a cross sectional view, the electrode sections 61 and 62 and their support posts 64 and 65 are not shown.

FIG. 6A also shows the silicon dioxide insulating section 31 that mechanically interconnects the needle support section 63 and the connecting section 67. Ways of forming the insulating section will be described in detail below with reference to FIGS. 9A–9E, 10A, 10B and 11.

FIG. 6B shows how the processing illustrated in FIG. 6A also forms part of the fixed electrode assembly 4. Selectively removing parts of the polyimide layer 74 and the insulating layer 73 not only defines the through hole 84, but also defines the through hole 85 that provides access to the anchor pad 45. Depositing the second layer of metal on the surface of the polyimide layer not only fills the through hole 84 with metal, but also fills the through hole 85 with metal. This forms a central portion 46 of the fixed electrode support post 42 of the fixed electrode assembly 4. Selectively removing parts of the second layer of metal not only defines the probe arm 17, but also defines the platform 47. The platform 47 constitutes part of the central portion of the fixed electrode support post.

Although not shown, a central portion of the limiter support post 52 of the probe travel limiter assembly 5 is formed at the same time and in the same way as the central portion of the fixed electrode support post 42.

FIG. 7A shows how the micro needle assembly 34 is formed on the needle support section 63 of the probe arm 17. A second polyimide layer 75 is deposited to cover the probe arm 17 and the underlying polyimide layer 74. The second polyimide layer is preferably deposited by spin casting to give the second layer of polyimide a flat surface. Part of the second layer of polyimide is removed to define the through hole 86. The through hole 86 provides access to the part of the needle support section 63 on which the needle post 36 will be constructed.

A third layer of metal, preferably aluminum, is then deposited on the surface of the second layer of polyimide 75. The thickness of the third layer of metal is preferably less than that of the second layer of metal since the needle mounting plate will later be defined in this layer. Depositing the third layer of metal fills the through hole 86 with metal to form the needle post 36. Parts of the third layer of metal are then selectively removed, preferably by etching, to define the needle mounting plate 37. Selectively removing parts of the third layer of metal to define the needle mounting plate simultaneously defines the fixed electrode 41, the aperture 43 and the probe travel limiter 51.

Conventional processing is then performed to form the micro needle 35 near the end of the needle mounting plate 37 remote from the needle post 36. The micro needle is formed from a metal such as iridium.

FIG. 7B shows how the processing illustrated in FIG. 7A completes fabrication of the fixed electrode assembly 4. Selectively removing part of the second layer of polyimide 75 not only defines the through hole 86, but also defines the through hole 87. The through hole 87 provides access to the platform 47 constituting part of the fixed electrode support post 42. Depositing the third layer of metal to fill the through hole 86 not only fills the through hole 86 with the metal, but also fills the through hole 87 with the metal. This completes fabrication of the fixed electrode support post 42. Selectively removing parts of the third layer of metal not only defines the needle mounting plate 37, but also defines the fixed electrode 41, the aperture 43, and the probe travel limiter 51, as noted above.

Although not shown, fabrication of the limiter support post 52 of the probe travel limiter assembly 5 is completed in the same way and at the same time as fabrication of the fixed electrode support post 42. As can be seen in FIG. 7A, the probe travel limiter 51 is defined in a position where it vertically overlaps part of the connecting section 67 of the probe arm 17.

The layered structure formed as just described is then plasma etched in an oxygen atmosphere to remove the polyimide layers 74 and 75. FIGS. 8A and 8B show the structure after removing the polyimide layers 74 and 75. Removing the polyimide layers leaves the probe arm suspended over the probe support surface 1, and leaves the probe arm separated from the probe support surface, the fixed electrode 41 and the probe travel limiter 51.

A first way of forming the insulating section 31 will be described next with reference to FIGS. 9A through 9E. In this, the insulating section is formed prior to defining the probe arm 17 by selectively etching the second layer metal.

Figure 9A:
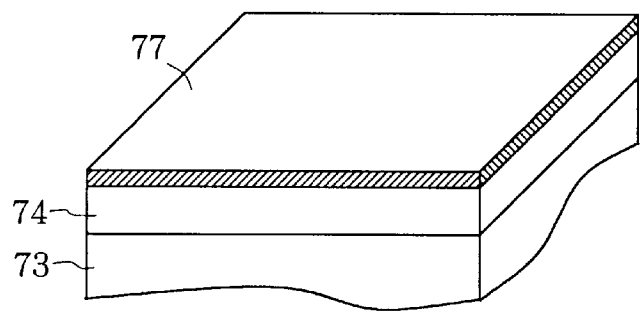
FIGS. 9A through 9E illustrate a first way of forming the insulating section between the electrode section and the needle support section of the probe arm in the course of forming the probe in the probe apparatus manufacturing method according to the invention.
Figure 9B:
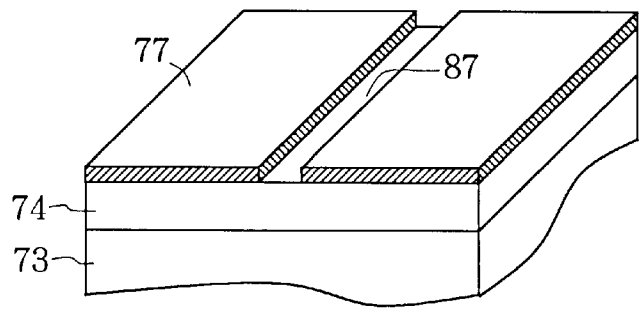

FIG. 9A shows the probe device immediately after the second layer of metal 77 has been deposited on the polyimide layer 74. The insulating layer 73 is shown below the polyimide layer. The second layer of metal is then selectively etched to form the trench 87 at the location where the insulating section 31 will be formed, as shown in FIG. 9B. The trench is longer than the width of the needle support section 63 (FIG. 1) and extends through the metal layer to expose the surface of the polyimide layer 74.

Figure 9C:
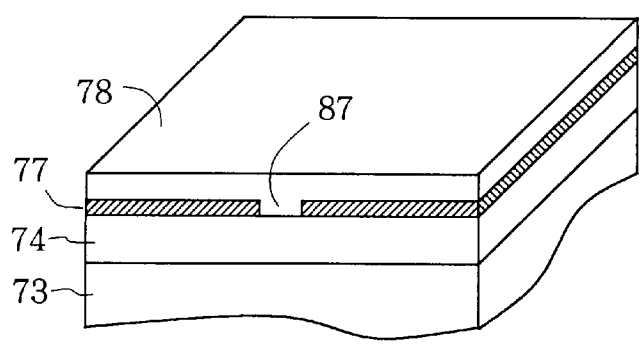

A layer of silicon dioxide 78 is then deposited to cover the surface of the polyimide layer 74. Depositing the layer of silicon dioxide on the surface of the polyimide layer fills the trench 87 with silicon dioxide, as shown in FIG. 9C.

Figure 9D:
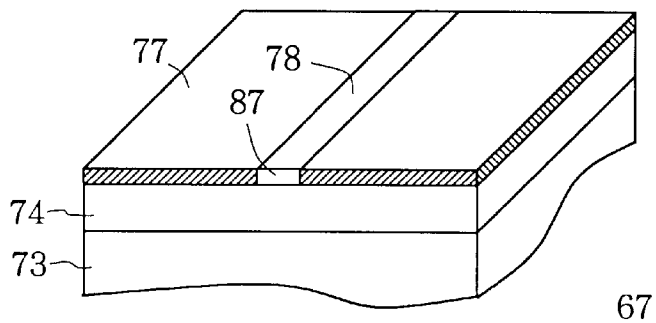

The silicon dioxide layer 78 is then dry etched back to remove the silicon dioxide from the surface of the metal layer 77. This leaves part of the silicon dioxide layer filling the trench 87, as shown in FIG. 9D.

Figure 9E:
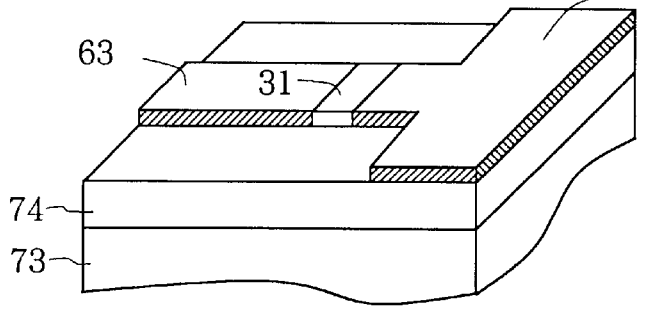

Finally, the aluminum layer 77 and insulating layer 78 are selectively dry etched to define the probe arm 17 and to reduce the length of the silicon dioxide layer 78 to match the width of the needle support section 63. Formation of the needle support section 63, the connecting section 67 and the insulating section 31 is shown in FIG. 9E.

Figure 10A:
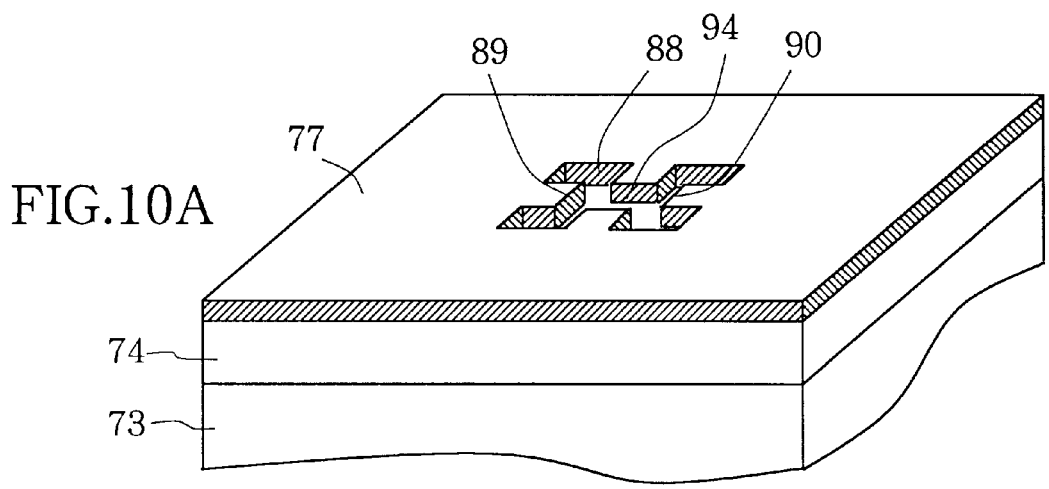
FIGS. 10A and 10B illustrate an alternative method of forming the insulating section.
Figure 10B:
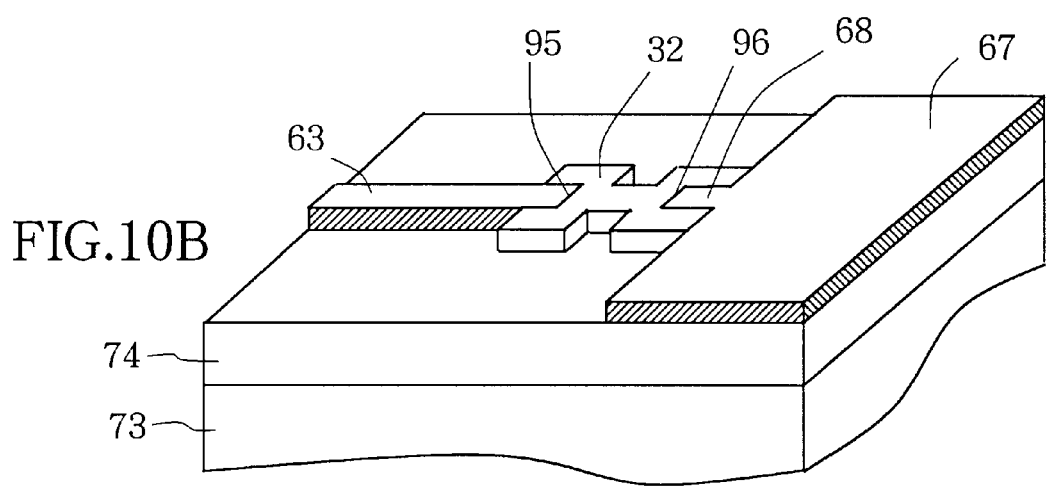

FIGS. 10A and 10B show another way of forming the insulating section between the needle support section and the connecting section of the probe arm. The mortised insulating section 32 formed in the way illustrated in FIGS. 10A and 10B provides a higher-strength mechanical connection between the needle support section 63 and the connecting section 67 than the insulating section 31 shown in FIG. 9E. FIG. 10A corresponds to FIG. 9B. Instead of etching the second layer of metal 77 to define the elongate trench 87, the second layer of metal is etched to form the trench 88 that includes the two mortises 89 and 90 that are mirror images of one another, and that are interconnected by the portion 94. The mortises 89 and 90 the portion 94 each have about the same width as that of the needle support section 63.

The mortised insulating section 32 is then formed by processing similar to that described above with reference to FIGS. 9C and 9D. The result of this processing is shown in FIG. 10D. The end of the needle support section 63 and the tenon 68 constituting part of the connecting portion 67 fit into the mortises 95 and 96 defined in the mortised insulating section. The mortises 95 and 96 increase the area of contact between the mortised insulating section and the needle support section 63 and the connecting section 67, respectively. This increases the strength of the mechanical connection between the needle support section 63 and the connecting section 67.

Figure 11:
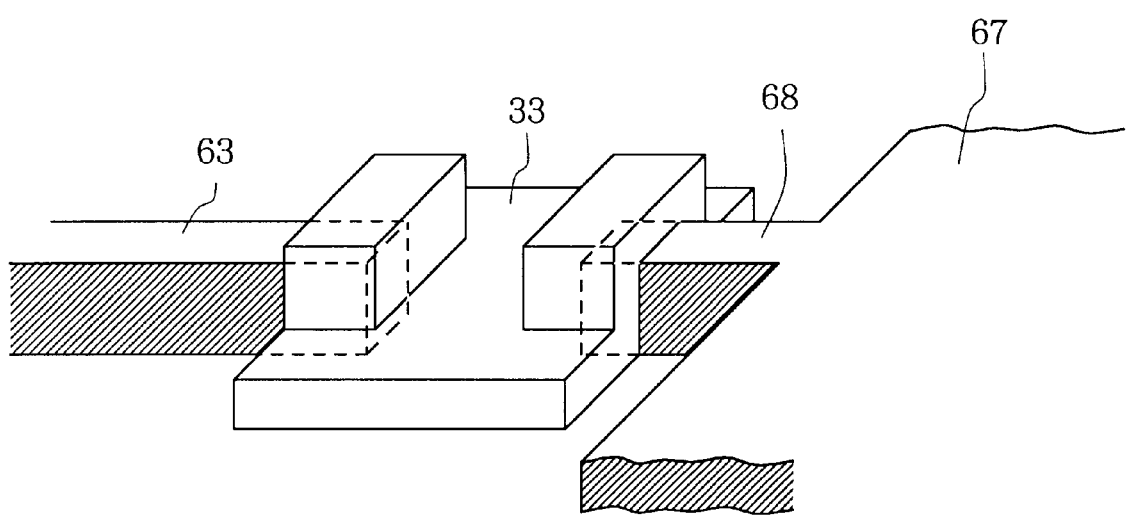
FIG. 11 shows another embodiment of the insulating section.

FIG. 11 shows another embodiment of a mortised insulating section 33 that has an even larger area of contact with the needle support section 63 and the connecting section 67 than the mortised insulating section 32. The mortised insulating section 33 therefore provides an even stronger mechanical interconnection between the needle support section and the connecting section. Moreover, the mortised insulating section 33 is simpler to make than the mortised insulating section 32.

To make the mortised insulating section, the second layer of metal 77 is deposited, and is selectively etched to define the probe arm 17, including the needle support section 63 and the connecting section 67. The connecting section is defined to include the tenon 68 that will engage with the mortised insulating section 33. A layer of silicon dioxide is then deposited and is selectively dry etched back to define the mortised insulation section 33.

In the above examples the insulating members 31, 32 and 33 are described as being formed using silicon dioxide, but they can be formed using other suitable insulating materials such as silicon nitride.

Although this disclosure describes illustrative embodiments of the invention in detail, it is to be understood that the invention is not limited to the precise embodiments described, and that various modifications may be practiced within the scope of the invention defined by the appended claims.

I claim:

1. A micro needle probe apparatus, comprising:
   a substrate having a surface;
   an electronic circuit formed in the substrate adjacent the surface, and including a metal interconnection layer; and
   a probe cantilevered over the electronic circuit, the probe including:
   a probe arm fabricated from a first single layer of metal and including an electrode,
   a micro needle mounted adjacent an end of the probe arm, and
   a probe support post anchoring the probe to the substrate.

2. The micro needle probe apparatus of claim 1, in which the probe support post provides an electrical connection between the electronic circuit and the probe arm.

3. The micro needle probe apparatus of claim 2, in which:
   the probe arm additionally includes:
   a micro needle support section on which the micro needle is mounted,
   an electrode section that functions as the electrode, the electrode section being mechanically coupled to, and electrically isolated from, the micro needle support section; and
   the micro needle support section and the electrode section are both fabricated from the first single layer of metal.

4. The micro needle probe apparatus of claim 3, in which the probe arm additionally includes an insulating section to which the micro needle support section and the electrode section are both attached.

5. The micro needle probe apparatus of claim 3, additionally comprising:
   a fixed electrode bridging the probe, the fixed electrode being fabricated from a second single layer of metal, and
   a fixed electrode support post anchoring the fixed electrode to the substrate.

6. The micro needle probe apparatus of claim 5, in which the fixed electrode defines an aperture through which the micro needle projects.

7. The micro needle probe apparatus of claim 5, additionally comprising:
   a probe travel limiter fabricated from the second single layer of metal; and a travel limiter support post anchoring the probe travel limiter to the substrate in a position at which the probe travel limiter overlaps part of the probe.

8. The micro needle probe apparatus of claim 1, in which:

the probe arm additionally includes:
   a micro needle support section on which the micro needle is mounted,
   an electrode section that functions as the electrode, the electrode section being mechanically coupled to, and electrically isolated from, the micro needle support section; and the micro needle support section and the electrode section are both fabricated from the first single layer of metal.

9. The micro needle probe apparatus of claim 8, in which the probe arm additionally includes an insulating section to which the micro needle support section and the electrode section are both attached.

10. The micro needle probe apparatus of claim 8, additionally comprising:
   a fixed electrode bridging the probe, the fixed electrode being fabricated from a second single layer of metal, and
   a fixed electrode support post anchoring the fixed electrode to the substrate.

11. The micro needle probe apparatus of claim 10, in which the fixed electrode defines an aperture through which the micro needle projects.

12. The micro needle probe apparatus of claim 10, additionally comprising:
   a probe travel limiter fabricated from the second single layer of metal; and
   a travel limiter support post anchoring the probe travel limiter to the substrate in a position at which the probe travel limiter overlaps part of the probe.

13. The micro needle probe apparatus of claim 1, additionally comprising:
   a fixed electrode bridging the probe, the fixed electrode being fabricated from a second single layer of metal, and
   a fixed electrode support post anchoring the fixed electrode to the substrate.

14. The micro needle probe apparatus of claim 13, in which the fixed electrode defines an aperture through which the micro needle projects.

15. The micro needle probe apparatus of claim 13, additionally comprising:
   a probe travel limiter fabricated from the second single layer of metal; and
   a travel limiter support post anchoring the probe travel limiter to the substrate in a position at which the probe travel limiter overlaps part of the probe.

16. The micro needle probe apparatus of claim 1, additionally comprising:
   a probe travel limiter fabricated from the second single layer of metal; and
   a travel limiter support post anchoring the probe travel limiter to the substrate in a position at which the probe travel limiter overlaps part of the probe.

17. A method of making a micro needle probe apparatus, the method comprising:
   providing a substrate;
   forming an electronic circuit in the substrate to include at least one layer of metal interconnections; and
   after forming the at least one layer of metal interconnections, forming a probe cantilevered over the electronic circuit, the probe being formed by:
   building a probe support post on the substrate,
   fabricating, from a single layer of metal, a probe arm attached to the probe support post, and
   forming a micro needle on the probe arm at a point remote from the probe support post.

18. The method of claim 17, in which:
   the probe arm is fabricated from the single layer of metal to include an electrode section and a micro needle support section mechanically coupled to, and electrically isolated from, the electrode section;
   the micro needle is formed on the micro needle support section; and
   the probe support is built electrically connected to the electronic circuit.

19. A moving-medium type memory device, comprising:
   a substrate having a surface;
   a memory medium disposed substantially parallel to the surface;
   a rectangular array of electronic circuits formed in the substrate adjacent the surface, each of the electronic circuits including a metal interconnection layer;
   a probe cantilevered over each of the electronic circuits, the probe including:
      a probe arm fabricated from a first single layer of metal and including an electrode,
      a micro needle located adjacent an end of the probe arm and extending from the probe arm towards the memory medium, and
      a probe support post anchoring the probe to the substrate.

20. The moving-medium type memory device of claim 19, additionally comprising:
   a fixed electrode bridging the probe, the fixed electrode being fabricated from a second single layer of metal; and
   a fixed electrode support post anchoring the fixed electrode to the substrate.

* * * * *